Sept. 16, 1924.  F. G. NORMAN  1,508,715
TYPE FORMING MACHINE
Filed Feb. 7, 1923

Inventor
F. G. Norman
By D. Swift
Attorney

Patented Sept. 16, 1924.

1,508,715

UNITED STATES PATENT OFFICE.

FRED G. NORMAN, OF DAVENPORT, IOWA.

TYPE-FORMING MACHINE.

Application filed February 7, 1923. Serial No. 617,568.

*To all whom it may concern:*

Be it known that I, FRED G. NORMAN, a citizen of the United States, residing at Davenport, in the county of Scott, State of Iowa, have invented a new and useful Type-Forming Machine; and I do hereby declare the following to be a full, clear, and exact description of the invention, such as will enable others skilled in the art to which it appertains to make and use the same.

The invention relates to type forming machines, and has for its object to provide an adjustable bracket located adjacent the metal pot and plunger, and provided with a torch, flame from which may be directed into any corner of the pot and on the plunger, thereby quickly melting the lead within the pot. It has been found that with the usual heating devices for the metal pot, that it requires considerable time in the morning to melt the lead within the pot and heat the plunger, and by providing an adjustable torch which projects a flame directly into the pot and onto the plunger, the lead may be quickly melted, and loss of time obviated.

A further object is to pivotally mount the torch bracket so that it will move in a horizontal plane as well as in a vertical plane, thereby allowing the flame to be positioned where it will project into any of the corners of the metal pot. Also to construct the bracket in such a manner whereby the discharge end of the torch may be adjusted at various distances from the metal within the pot.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
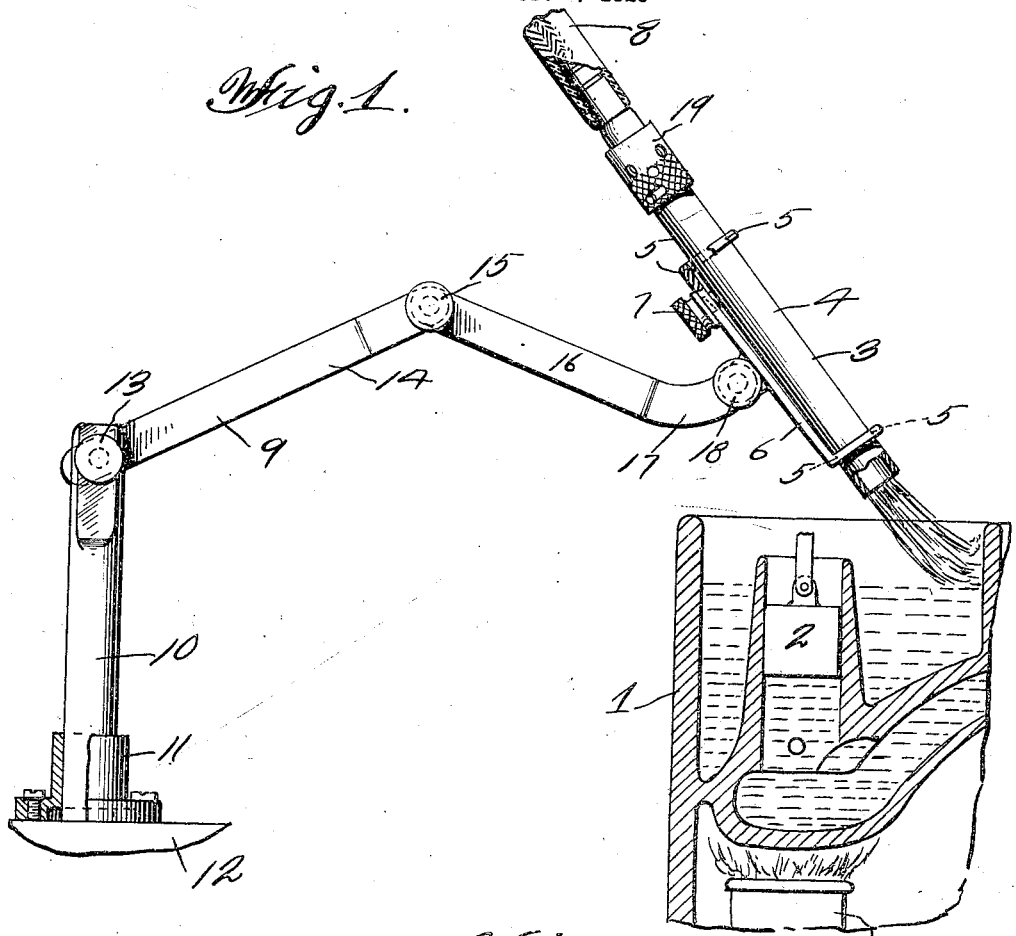
Figure 1 is a side elevation of the torch and bracket, showing the same in position for projecting a flame into a metal pot.
Figure 2:
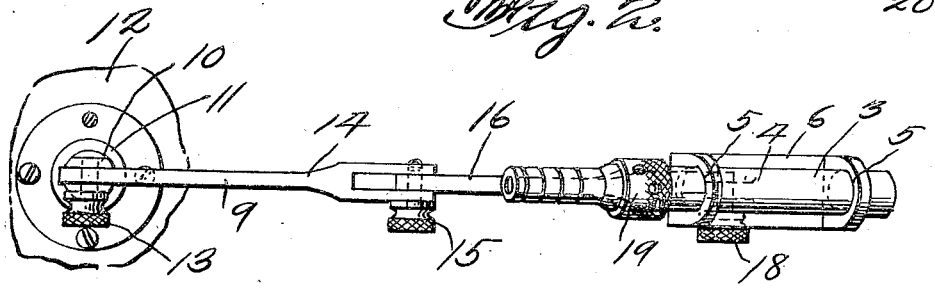
Figure 2 is a top plan view of the adjustable bracket and torch.

Referring to the drawing, the numeral 1 designates a conventional form of metal pot of a type setting machine and 2 a plunger disposed therein. It has been found that it requires considerable time in melting the metal within the pot 1 in the morning particularly, when the machines are started for the day, and also the metal around the plunger is particularly hard to melt at this time. To overcome this difficulty a torch 3 is provided, which torch comprises the cylindrical burner portion 4 which is adjustably mounted in apertures 5 of a yoke 6 and held in adjusted position in said yoke by means of a set screw 7. Gas is supplied to the torch through the flexible pipe 8, which may lead to any suitable source of supply. The torch 3 is supported on an adjustable bracket 9, which bracket is adjustable in a vertical or horizontal plane, in such a manner that the torch may be positioned for projecting a flame into any part of the metal pot 1.

The bracket 9 comprises a vertically disposed shaft 10, the lower end of which is rotatably mounted in a socket 11 adapted to be attached to a portion 12 of the type machine adjacent the metal pot 1. The upper end of the shaft 10 has pivotally connected thereto by means of a set screw 13 arms 14, which arm may be adjusted to various positions in a vertical plane for varying the position of the burner 3 in a vertical plane. The outer end of the arm 14 has pivotally connected thereto on a set screw 15 a second arm 16, which second arm has its outer end curved upwardly as at 17 and pivotally connected to the yoke 6 by means of the set screw 18. It will be seen that by loosening the set screws 13, 16 and 18 that the burner may be positioned in various positions vertically in relation to the metal pot 1 so that a flame may be projected against the metal in the metal pot at any desired position for melting the same, and if so desired the flame may be directed onto the plunger 2 for softening the metal adjacent thereto. By pivotally mounting the shaft 10 in the socket 11, it will be seen that the burner may be moved to various positions in a horizontal plane, and in connection with the vertical adjustment of the burner a flame may be projected into the metal pot from any part thereof, and with the adjustment of the yoke on the arm 16 through the medium of the set screw 18, the burner may be positioned at various angles or vertically. By manipulating the set screw 7 the burner has a further adjustment in the bearings 5 of the yoke 6. Burner 3 is provided with an apertured sleeve 19 through the apertures of which air is admitted to the gas passing through the burner for adjusting the intensity of the flame.

From the above it will be seen that a burner is provided in connection with metal pots of a type setting machine, by means of which burner the flame may be directed directly into the pot in contact with the metal therein, in such a manner that the metal may be easily and quickly melted in the minimum amount of time, thereby obviating the loss of time incident to melting the metal through the usual burner 20, disposed beneath the metal pot. It will also be seen that the flame may be directed directly on the plunger in the metal pot for quickly melting the metal adjacent the same.

The invention having been set forth what is claimed as new and useful is:—

1. A vertically and horizontally adjustable bracket for supporting a burner, said bracket comprising a vertically disposed pivoted shaft, an arm pivotally and adjustably connected to the upper end of the shaft, said arm being formed in two sections pivotally connected together by means of a set screw, a yoke pivotally connected to the outer end of the outer section of the arm by means of a set screw, said yoke having adjustably mounted therein the burner.

2. A burner torch support, said support comprising a vertically disposed rotatable shaft, an arm pivotally and adjustably connected to said shaft, said arm being formed from pivotally and adjustably connected sections, a yoke pivotally and adjustably connected to the outer end of the arm, said yoke comprising a plate pivoted to the arm, apertured ears carried by the ends of the plate and adapted to receive a burner, and a set screw carried by said plate and cooperating with the burner for securely holding the same in the yoke.

In testimony whereof I have signed my name to this specification in the presence of two subscribing witnesses.

FRED G. NORMAN.

Witnesses:
W. F. SIEGLE,
G. LOHRMANN.